(12) United States Patent
Peel

(10) Patent No.: US 8,142,253 B2
(45) Date of Patent: Mar. 27, 2012

(54) TURKEY CALL WITH INTERCHANGEABLE PADDLE/STRIKER

(76) Inventor: G. David Peel, Washington, IN (US)

( * ) Notice: Subject to any disclaimer, the term of this patent is extended or adjusted under 35 U.S.C. 154(b) by 217 days.

(21) Appl. No.: 12/353,426

(22) Filed: Jan. 14, 2009

(65) Prior Publication Data

US 2010/0178843 A1 Jul. 15, 2010

(51) Int. Cl.
A63H 5/00 (2006.01)
(52) U.S. Cl. ........ 446/397; 446/404; 446/418; 446/421; 446/422; 84/402; 84/410
(58) Field of Classification Search .................. 446/397, 446/418, 421, 422, 404; 84/402, 410
See application file for complete search history.

(56) References Cited

U.S. PATENT DOCUMENTS

| | | | | | |
|---|---|---|---|---|---|
| 4,019,277 | A | * | 4/1977 | Kenkelen | 446/81 |
| 4,422,262 | A | * | 12/1983 | Moss | 446/397 |
| 5,207,769 | A | * | 5/1993 | Malta | 84/404 |
| 5,830,036 | A | * | 11/1998 | Richardson | 446/397 |
| 6,168,493 | B1 | * | 1/2001 | Kirby | 446/418 |
| 6,669,528 | B2 | * | 12/2003 | Kaelin | 446/397 |
| 6,942,539 | B1 | * | 9/2005 | Kirby | 446/397 |
| 7,347,762 | B1 | * | 3/2008 | Long | 446/418 |
| 7,575,500 | B1 | * | 8/2009 | Salter et al. | 446/397 |
| 2003/0114073 | A1 | * | 6/2003 | Kaelin, II | 446/200 |
| 2006/0252341 | A1 | * | 11/2006 | Olinde | 446/202 |
| 2007/0184752 | A1 | * | 8/2007 | Zearing | 446/418 |
| 2008/0280525 | A1 | * | 11/2008 | Carr | 446/397 |
| 2009/0258569 | A1 | * | 10/2009 | Wade | 446/418 |
| 2011/0070806 | A1 | * | 3/2011 | Burcham | 446/418 |
| 2011/0097970 | A1 | * | 4/2011 | Wyant | 446/418 |

* cited by examiner

*Primary Examiner* — Gene Kim
*Assistant Examiner* — Alexander Niconovich
(74) *Attorney, Agent, or Firm* — Taft, Stettinius & Hollister, LLP; Stephen F. Rost, Esq.

(57) ABSTRACT

A box turkey call comprising a sound box with a bottom wall, side walls, front end wall and back end wall, a first quick changeable attachment component secured to the front end wall, a striker having a front end, a distal back end, a top surface and a bottom surface, where the back end of the striker comprises an integrated handle, where the bottom surface of the striker is rounded laterally, and where the front end of the striker has a second quick changeable attachment component, where the first quick changeable attachment component and the second quick changeable attachment component are in pivotal but quickly detachable engagement.

11 Claims, 9 Drawing Sheets

TURKEY CALL WITH INTERCHANGEABLE PADDLE/STRIKER

FIELD OF THE INVENTION

The present invention relates to the field of turkey calls. More specifically, the present invention is concerned with a box turkey call having an interchangeable striker, or paddle, that can be easily and quickly changed without loosening or otherwise removing connection components such as screws, nuts, springs or washers.

BACKGROUND OF THE INVENTION

This invention relates to a turkey call and more specifically to the type of turkey call known as a box call. The box call produces sound by striking or rubbing a typically chalk-covered wooden striker, or paddle, against the sidewalls of a sound box. The sound box is held in one hand and the striker is held in the other hand and manipulated against at least one of the upper edges of the side walls. Box type turkey calls are typically manufactured of wood (but not limited to wood only) and include a sound box that takes the form of an upwardly open elongated box having arcuate edges on laterally spaced side walls joined by a bottom wall. A striker, typically wooden, covers the top of the box and is conventionally pivotally fastened to the front end of the box for lateral reciprocation against the upper edges of the side walls. The striker typically has a rounded lower surface which is conventionally coated with chalk, resin or other synthetic material, and a sound is emitted by drawing the coated rounded lower surface of the striker across the arcuate upper edges of the side walls. A box type turkey call of the type described is disclosed in U.S. Pat. No. 574,534 issued Jan. 5, 1897 to H. C. Gibson.

Numerous designs for box turkey calls have been provided in the prior art. These designs are exemplified by the following patents:

U.S. Pat. No. 574,534, Turkey Caller and Gobbler, issued to Gibson on Jan. 5, 1897.

U.S. Pat. No. 2,511,403, Sound Producing Device, issued to Fleener on Jun. 13, 1950.

U.S. Pat. No. Des. 231,927, Game Call, issued to Shoemaker on Jun. 25, 1974.

U.S. Pat. No. 4,343,108, Double Deep Tone Gobbler Turkey Call, issued to Lee on Aug. 10, 1982.

U.S. Pat. No. 4,422,262, Game Call Having Blades of Differing Height, issued to Moss on Dec. 27, 1983.

U.S. Pat. No. 4,664,641, Box Type Turkey Call with Eccentrically Mounted Actuator, issued to Hearn et al. on May 12, 1987.

U.S. Pat. No. 4,846,753, Turkey Call with Sound Chamber, issued to Langston on Jul. 11, 1989.

U.S. Pat. No. 4,932,930, Box-Type Turkey Caller with Scalloped Actuator, issued to Hearn on Jun. 12, 1990.

U.S. Pat. No. 5,380,235, Turkey Call with Silencer, issued to Forbes et al. on Jan. 10, 1995.

U.S. Pat. No. 5,484,319, Box Call Apparatus and Method, issued to Battey on Jan. 16, 1996.

U.S. Pat. No. Des. 393,810, Slideable Chambered Turkey Call, issued to Richardson on Apr. 28, 1998.

U.S. Pat. No. 5,830,036, Chambered Striker Turkey Call with Optionable Chambered Side Panels and Pivotable and Lockable Slide Action Variable Tone Selector, issued to Richardson on Nov. 3, 1998.

U.S. Pat. No. 5,846,119, Turkey Call and Accessories, issued to Long on Dec. 8, 1998.

U.S. Pat. No. Des. 415,054, Box Call, issued to Foster et al. on Oct. 12, 1999.

U.S. Pat. No. Des. 417,166, Turkey Call, issued to DeGroot on Nov. 30, 1999.

U.S. Pat. No. 6,149,493, Turkey Call and Accessories, issued to Long on Nov. 21, 2000.

U.S. Pat. No. 6,168,493, Game Call Reliably Adjustable for Different Sounds, issued to Kirby on Jan. 2, 2001.

U.S. Pat. No. 6,942,539, Sound Quality Box Call, issued to Kirby on Sep. 13, 2005.

A common feature in these prior art designs is a means of pivotally attaching the striker to the sound box. This attachment is typically accomplished with a fastener such as a screw that fits loosely through a hole in the front end of the striker with the screw anchored to the front end of the sound box.

It is known that different sound characteristics can be generated by using strikers of different designs and compositions. For example, the striker may be made from a variety of woods, such as cherry, maple, pine or oak. Additionally, the curvature of the bottom surface of the striker can be varied as well as the length or width, for example. The necessity to modify the sound characteristics of a turkey call by changing the combination of striker and sound box results from the experience of hunters who have found that optimum hunting results, i.e. the ability to call and attract turkeys, may require different sounds, perhaps for different turkeys on different days or in different conditions. However, the optimum combination of striker and sound box may not be known in advance, so turkey hunters may carry multiple turkey calls, sound boxes and strikers with them during a hunting trip.

None of the box turkey calls from the prior art disclose a striker that can be quickly attached and detached without removing attachment hardware such as screws, nuts, springs and washers. To change the combination of striker and sound box, the means of attachment, for example a screw or bolt, must be unscrewed from the sound box, the striker removed, a different striker or sound box selected, and the screw or bolt reinserted in the hole in the selected striker and reattached to the sound box.

While these designs provide for adequate functionality in a turkey box call given a single selection of striker, none of these designs provides for a quick changeable striker that can be detached and attached to the sound box without removing hardware or other means of attachment and that would facilitate quickly changing the operating characteristics of the turkey call by utilizing different selected strikers. It can be appreciated that when a hunter is in the field, and often in low light conditions, there is a need for a quick and efficient means of changing strikers on a turkey call. The process of using a screwdriver or other tool to remove a fastener in order to change the striker is cumbersome and leads to the possibility of losing the fastener in low light conditions by dropping it in leaves, handling the small fastener may be made even more difficult if the outside temperatures are low and the hunter's fingers are cold, and the excessive manipulation of tools, fasteners and the box call itself may result in unwanted noise that can scare away the game birds being hunted.

As such, it may be appreciated that there is a continuing need for a new and improved box turkey call that will allow a more efficient utilization and changeability of a variety of strikers. The present invention provides a novel method of attaching the striker to the sound box portion of the call that fulfills this need. Additionally, the prior patents and commercial techniques do not suggest the present inventive combination of component elements arranged, configured and utilized in the method as disclosed herein.

The present invention achieves its intended purposes, objects, and advantages through a new, useful and unobvious combination of component elements, with the use of a minimum number of functioning parts, at a reasonable cost to manufacture, and by employing only readily available materials.

SUMMARY OF THE INVENTION

It is the object of the present invention to provide a quick changeable striker for a box turkey call that can be attached and detached without removing attachment components, such as screws or bolts, from the sound box of the turkey call. This invention allows a hunter to carry a multitude of strikers that can be quickly and easily interchanged on a sound box.

In one preferred embodiment of the invention, the striker paddle is designed with a slot having a recessed socket opposite the slot opening. The slot with recessed socket allows the striker to engage with a spring loaded ball nut on the sound box for pivotal attachment.

In order that the detailed description of the invention may be better understood and that the present contribution to the art can be more fully appreciated, additional features of the invention will be described hereinafter. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention.

In this respect, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. Embodiments described herein have made reference to a box turkey call for ease of conceptualizing the functionality of the invention, however it is to be understood that other game calls, such as a goose call, can make similar use of this invention.

Accordingly, it is an object of the invention to provide an improved product for box game calls, such as box turkey calls.

For a better understanding of the invention, its operating advantages and the specific objects attained by its uses, reference should be made to the accompanying drawings and descriptive matter in which there are illustrated preferred embodiments of the invention. The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiments in addition to the scope of the invention illustrated by the accompanying drawings.

BRIEF DESCRIPTION OF THE DRAWINGS

The foregoing and other objects, features and advantages of the invention will become more fully understood from the following description of the preferred embodiments of the invention as illustrated in the accompanying drawings in which like reference characters refer to the same parts throughout different views. The drawings are not necessarily to scale, emphasis instead being placed upon illustrating the principles of the invention.

DRAWING REFERENCE NUMERALS

Figure 1:
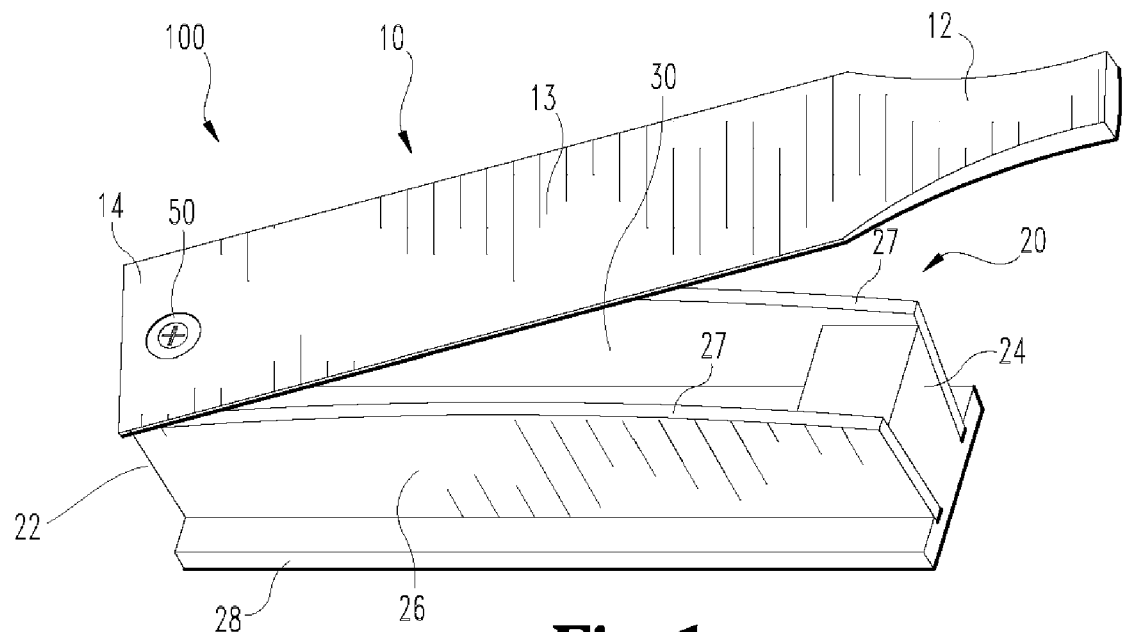
FIG. 1 is a perspective view of a box turkey call typical of the prior art with no slot in the striker and the striker angled away from the sound box.

The following table lists the drawing reference numerals with a brief description of each identifying numeral.

| | |
|---|---|
| 10 | Striker, prior art |
| 11 | Slotted striker |
| 12 | Back end of striker |
| 13 | Top surface of striker |
| 14 | Front end of striker |
| 15 | Bottom surface of striker |
| 16 | Slot in striker |

-continued

| 17 | Hole in striker, prior art |
| 18 | Recessed socket in slot |
| 19 | Beveled bottom of striker front end |
| 20 | Sound box |
| 22 | Front end wall of sound box |
| 24 | Rear end wall of sound box |
| 26 | Side wall of sound box |
| 27 | Top edge of side wall of sound box |
| 28 | Bottom of sound box |
| 30 | Hollow inner of sound box |
| 50 | Attachment stud |
| 51 | Rotator ball nut |
| 52 | Flat washer |
| 54 | Spring |
| 100 | Box turkey call assembly, prior art |
| 110 | Box turkey call assembly with quick changeable striker |

DETAILED DESCRIPTION OF THE INVENTION

Referring now to the drawings, a box turkey call from the prior art is broadly indicated as 100 in FIG. 1. The box type turkey call 100 comprises a paddle shaped striker 10 and a sound box 20. The sound box 20 is typically made of wood and may be formed from a single block of wood or may be formed from separate pieces of wood appropriately joined to define side walls 26, front end wall 22 and rear end wall 24 joined by a bottom wall 28. The walls 26, 22, 24 and 28 define an open topped cavity 30 in the sound box 20. The side walls 26 are relatively thin and their upper edges typically are inclined outward from the center of the sound box 20 and designed with arcuate upper edges 27 such that the side walls 26 peak near the middle portion of the sound box 20 midway between front end wall 22 and rear end wall 24. Additionally, the upper edges 27 of the side walls 26 are typically beveled.

Figure 2:
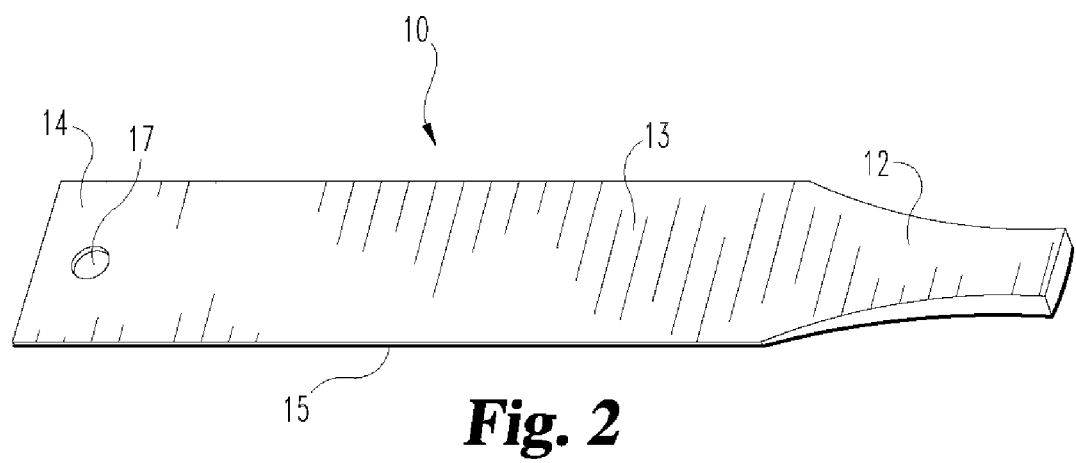
FIG. 2 is a perspective view of a striker of the prior art.

The striker 10 shown in FIG. 2 is preferably slightly wider than the sound box 20 and overhangs the side walls 26. The striker 10 is longer than the sound box 20 and includes a handle 12 extending beyond the rear end wall 24. The front end 14 of the striker 10 includes a through hole 17 that allows the striker 10 to be pivotally connected to the sound box 20 by an attachment means such as a screw 50. The bottom surface 15 of the striker 10 is rounded laterally, and lateral reciprocation of the striker 10 causes the rounded bottom surface 15 of the striker 10 to rub against the top edges 27 of the thin side walls 26 of the sound box 20 emitting sounds in imitation of turkeys.

The box type call 100 as thus far described is conventional, and it is with a structure of this type that the present invention is intended for use.

Figure 3:
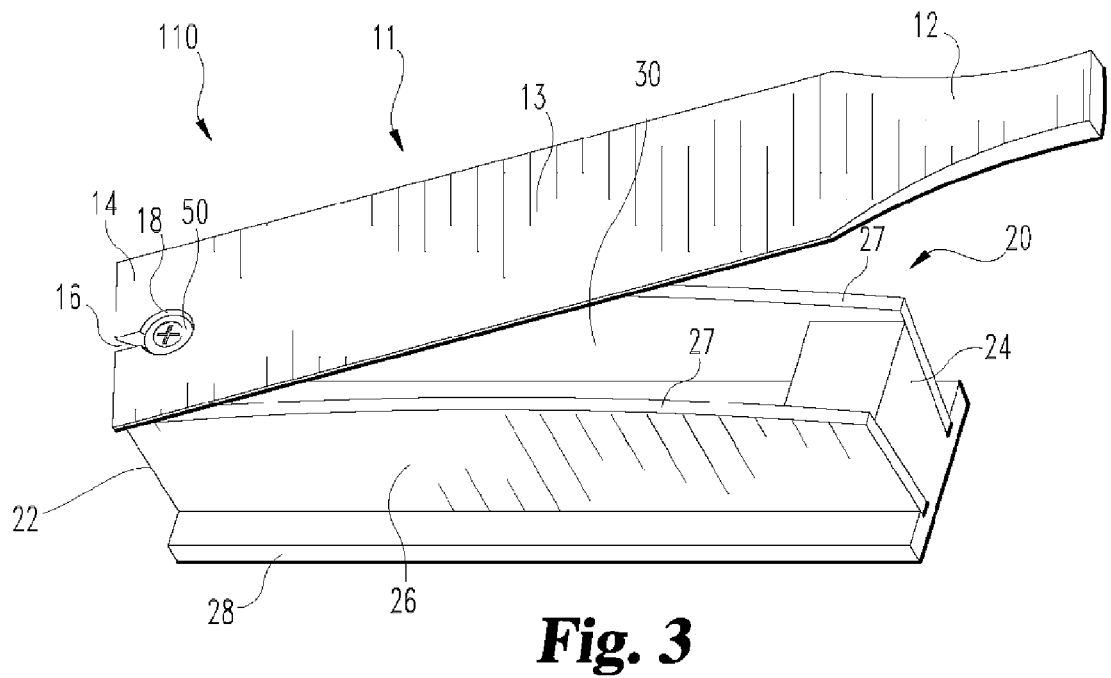
FIG. 3 is a perspective view of a first embodiment of a box turkey call having a slotted striker in accordance with the present version of the invention and the striker angled away from the sound box.
Figure 4:
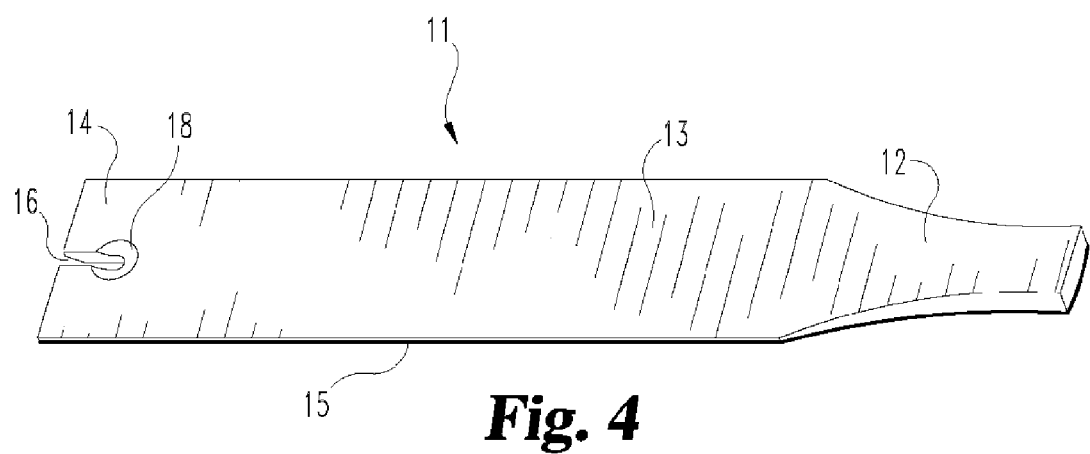
FIG. 4 is a perspective view of a slotted striker in accordance with the present invention.

A box turkey call 110 assembly according to the present invention is shown in FIG. 3. In one embodiment of the present invention is disclosed a paddle shaped striker 11 with an attachment slot 16 with recessed socket 18 that allows the striker 11 to be quickly attached and detached from the attachment components held in place by the attachment stud 50 of the sound box 20. The slot 16 and recessed socket 18 are more clearly shown in FIG. 4.

Figure 7:
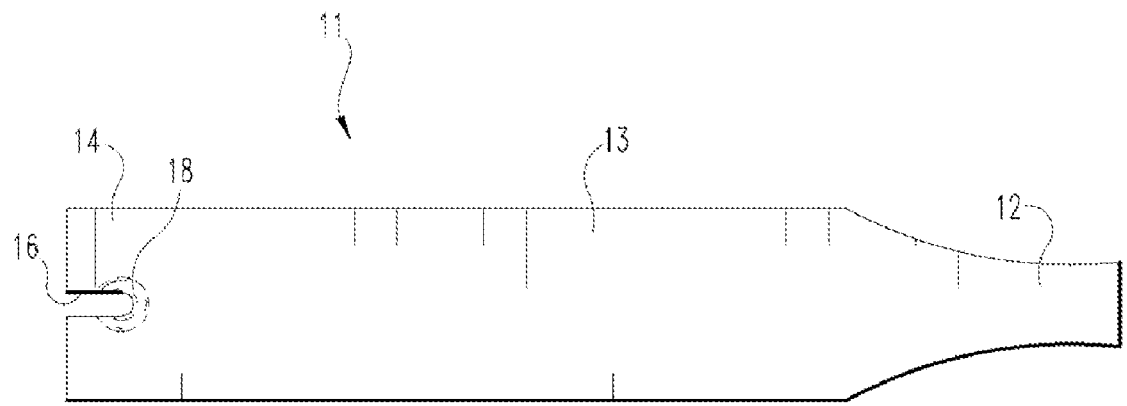
FIG. 7 is a top view of a first embodiment of a slotted striker for a box turkey call in accordance with the present version of the invention.

In FIG. 7, a top view of the slotted striker 11 shows the top surface 13 of the striker 11. The slot 16 with recessed socket 18 is shown at the front end 14 of the striker. The back end 12 of the striker provides a handle. In one embodiment, the recessed socket 18 is a cavity that is substantially hemispherical in shape.

Figure 5:
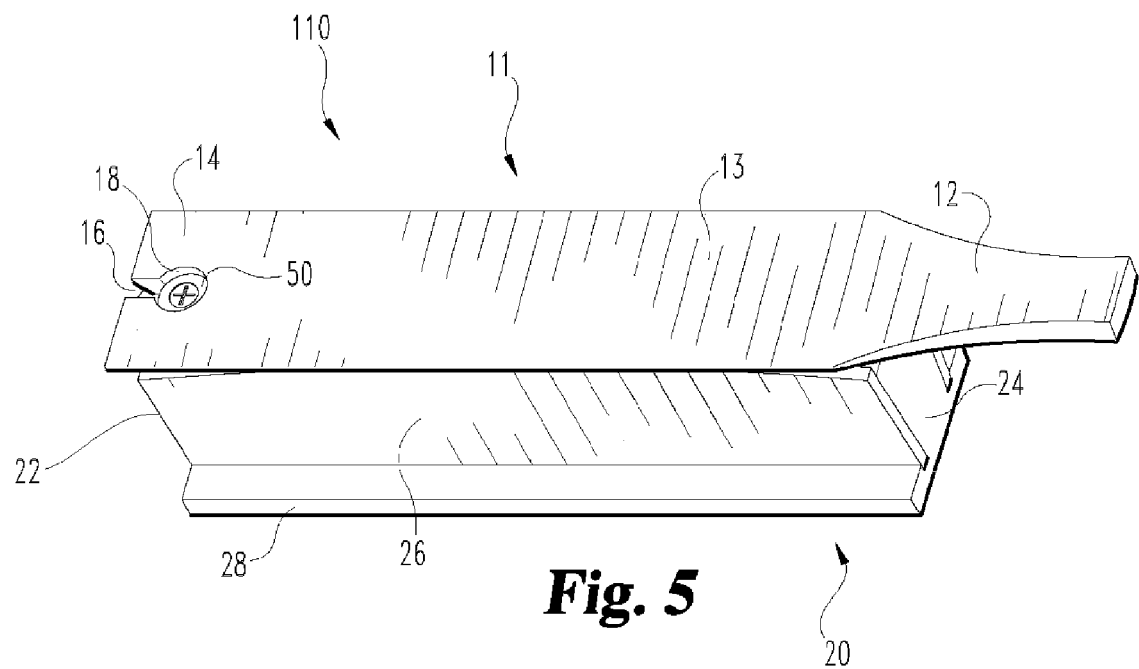
FIG. 5 is a perspective view of a first embodiment of a box turkey call having a slotted striker in accordance with the present version of the invention and the striker in line with the sound box.
Figure 6:
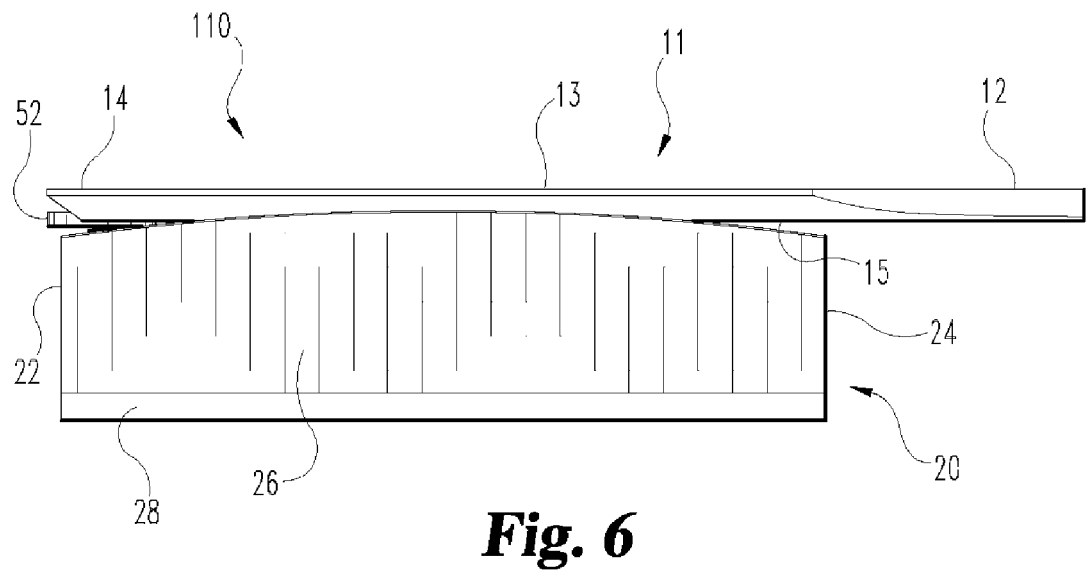
FIG. 6 is an elevation view of a first embodiment of a box turkey call having a slotted striker in accordance with the present version of the invention and the striker in line with the sound box.
Figure 8:
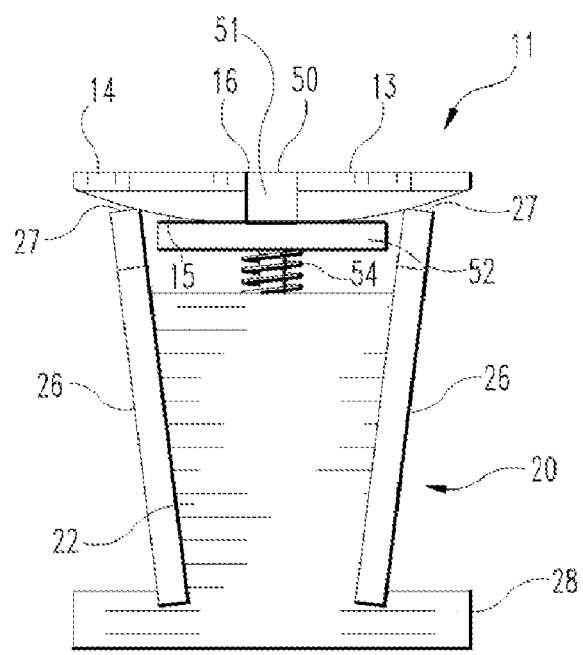
FIG. 8 is front view of a first embodiment of a box turkey call having a slotted striker in accordance with the present version of the invention and the striker in line with the sound box.
Figure 9:
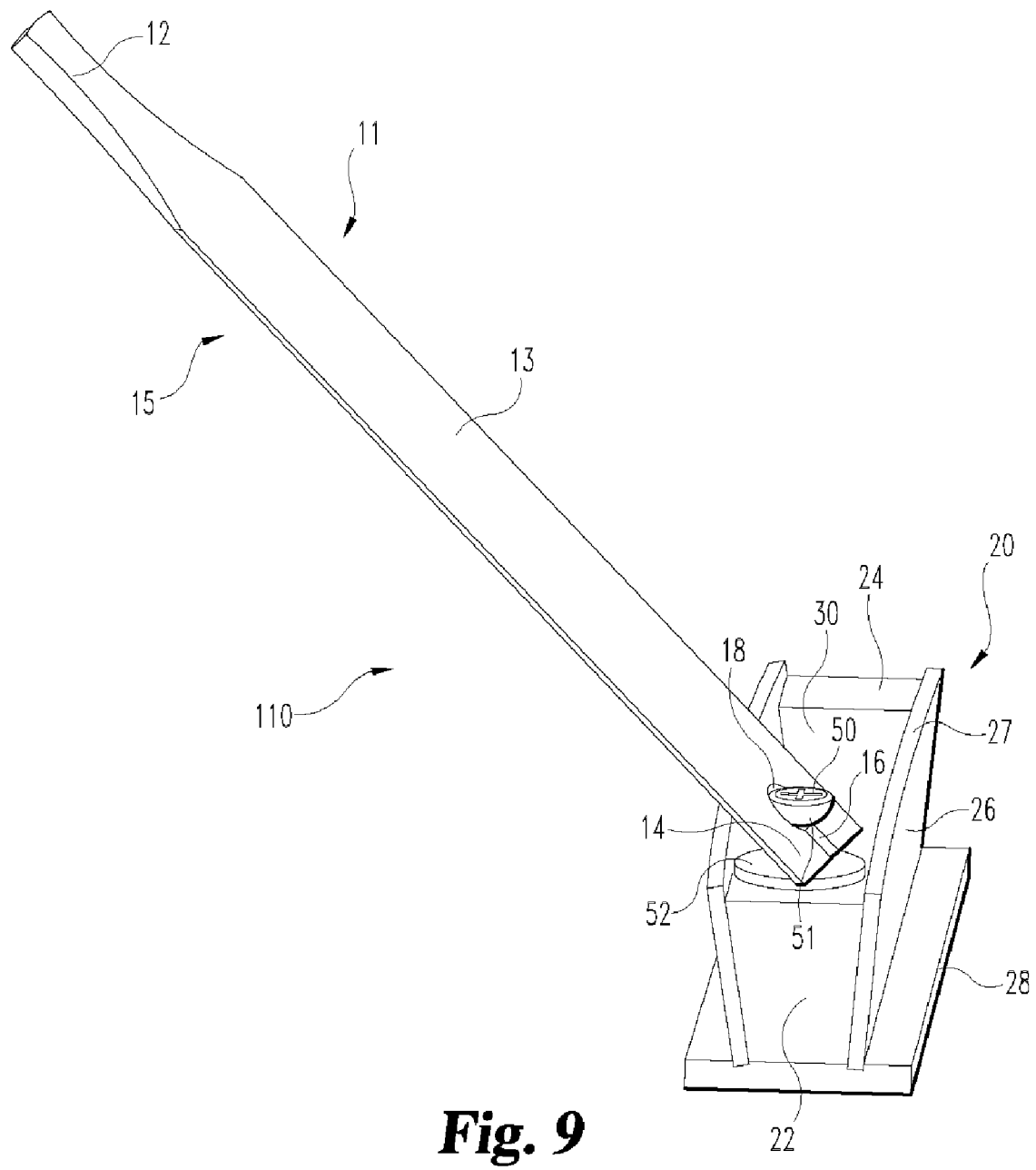
FIG. 9 is a perspective view from the front of a first embodiment of a box turkey call having a slotted striker in accordance with the present version of the invention and the striker angled away from and still attached to the sound box.

The recessed socket 18 allows the striker 11 to pivot in relation to the sound box 20 from a position angled away from the sound box 20 as shown in FIG. 3 and FIG. 9, to a position aligned with the sound box 20 as shown in FIG. 5, FIG. 6 and FIG. 8. An imitation turkey call is emitted by rubbing the bottom 15 of the striker 11 against the upper edges 27 of the sidewalls 26 while moving between the angled and aligned positions.

A view of the quick detachable striker 11 engaged with the sound box 20 is shown in FIG. 8 from the front. This view shows that the striker 11 rests above a flat washer 52 which is forced up against the bottom 15 of the striker 11 by a compression means, such as a spring 54. An attachment stud 50, which might be a screw or bolt, secures a rotator ball nut 51 which is forced in pivotal engagement against the recessed socket 18 of the striker 11.

Figure 14:
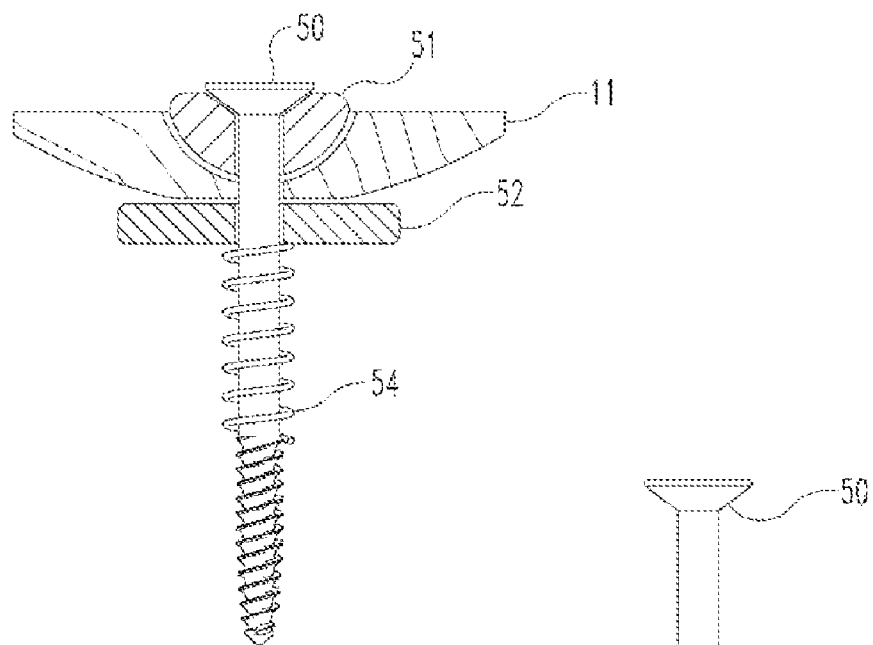
FIG. 14 is a cross section view of slotted striker attachment components.
Figure 15:
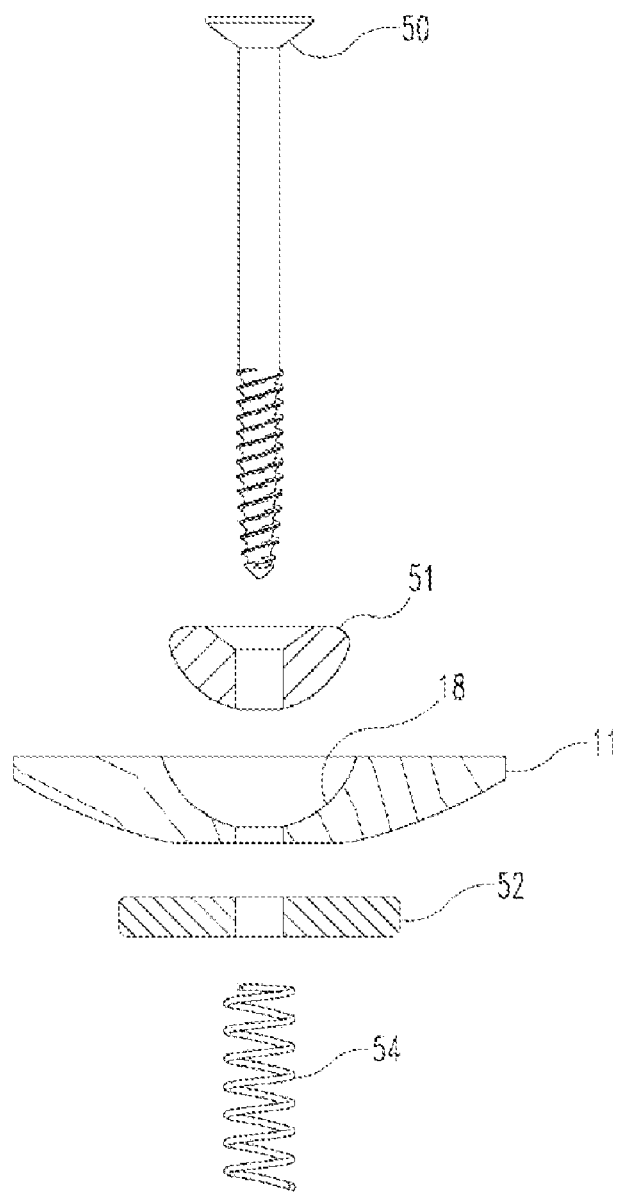
FIG. 15 is an exploded view of the slotted striker attachment components.

One embodiment of the attachment components is shown in FIG. 14 and FIG. 15, where a cross sectional view at the location of the recessed socket 18 is shown. The combination of an attachment stud 50, a rotator ball nut 51, a flat washer 52 and a spring 54 are utilized to form a spring loaded attachment for the striker 11. The front end 14 of the striker 11 which has the slot 16 with recessed socket 18 is pivotally attached by inserting the slot 16 laterally across the attachment stud 50 above the flat washer 52 and below the rotator ball nut 51. The spring 54 is compressed between the top of the front end wall 22 of the sound box and the bottom of the flat washer 52 so that the slotted striker 11 is held in place between the rotator ball nut 51 and the flat washer 52.

Figure 12:
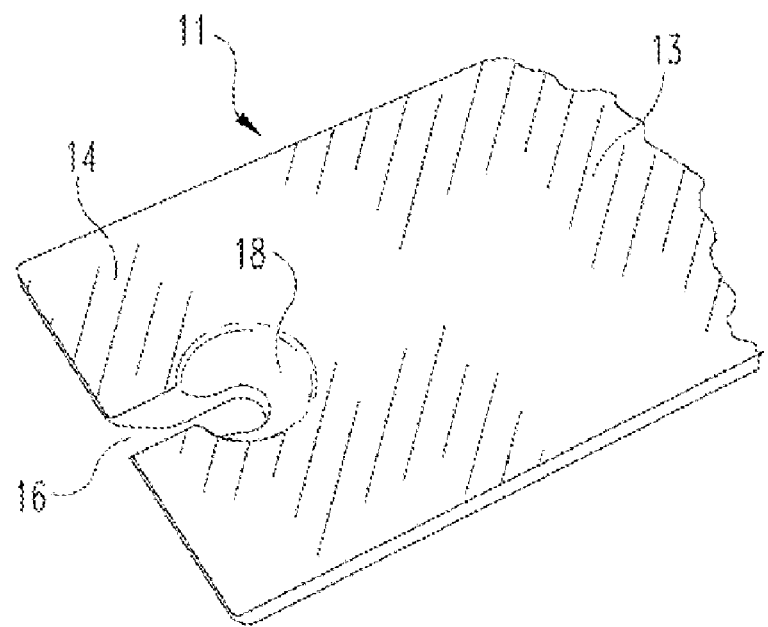
FIG. 12 is a top perspective view of the front end of the striker showing the slot with recessed socket.
Figure 13:
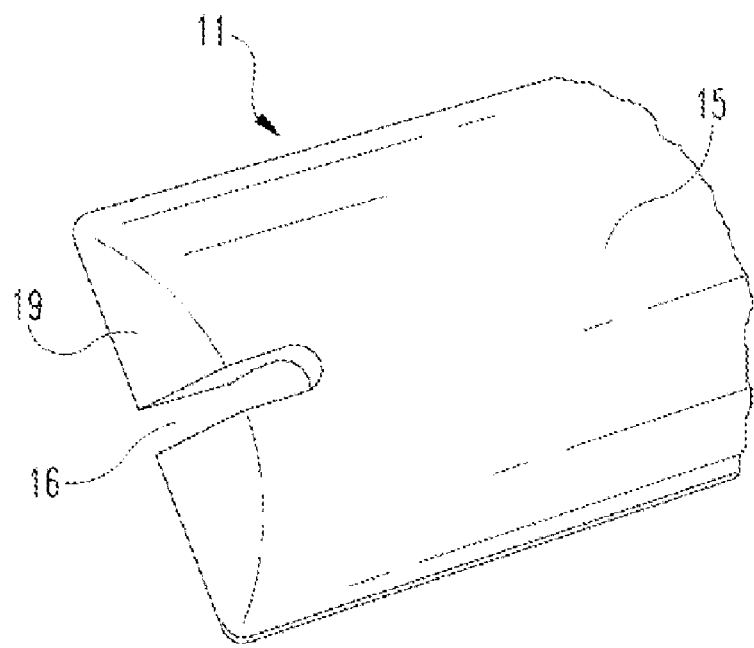
FIG. 13 is a bottom perspective view of the front end of the striker showing the slot.

The slot 16 and recessed socket 18 at the front end 14 of the top surface 13 of the striker 11 are shown in detail in FIG. 12. The bottom surface 15 of the striker is shown in FIG. 13. The bottom of the front end 14 of the striker has a beveled edge 19 to facilitate the insertion of the slotted front end 14 of the striker 11 between the compressive fitting rotator ball nut 51 and flat washer 52.

Figure 10:
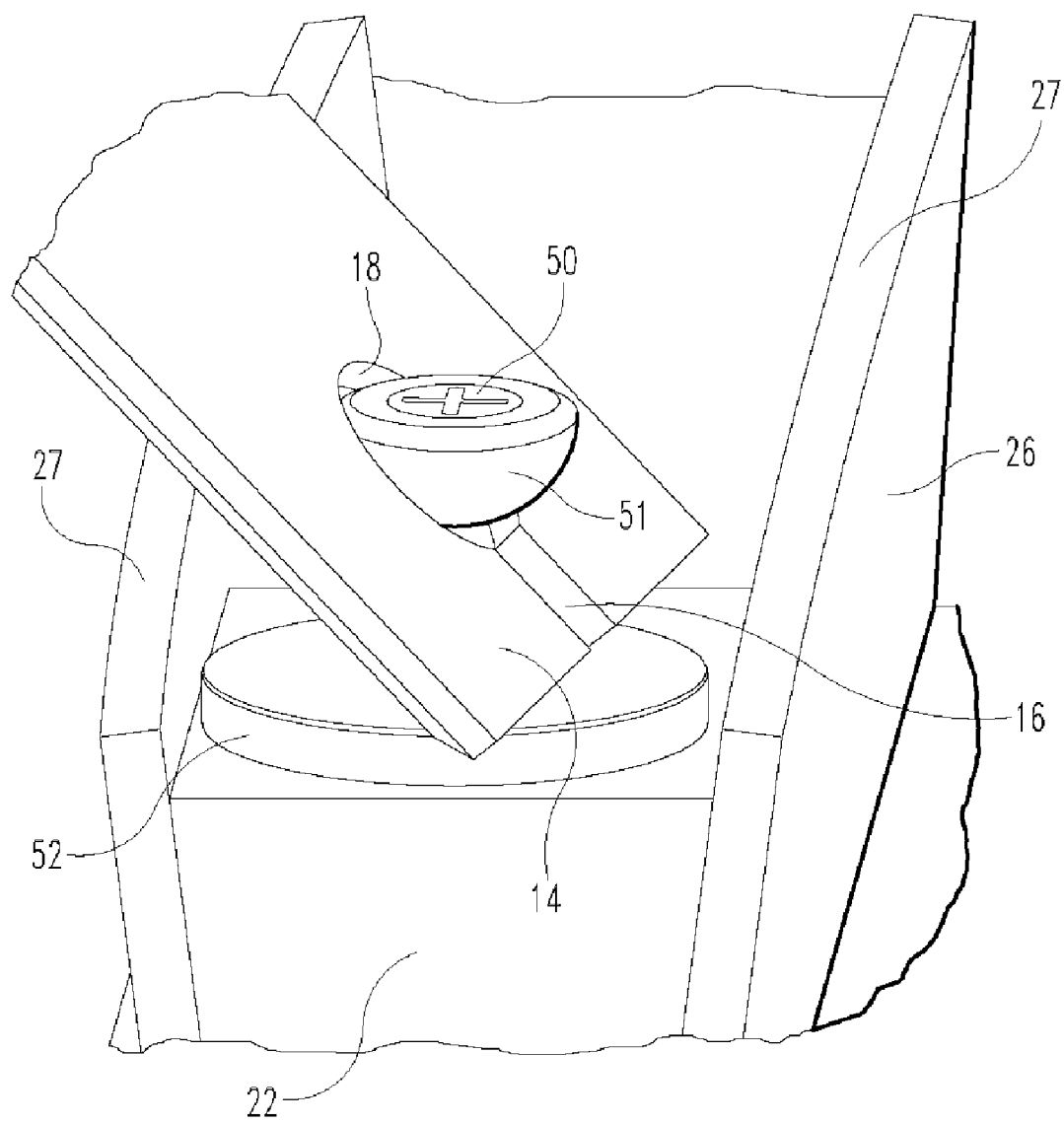
FIG. 10 is an expanded perspective view from the front of a first embodiment of a box turkey call having a slotted striker in accordance with the present version of the invention and the striker angled away from and still attached to the sound box.

The striker 11 is inserted between the rotator ball nut 51 and the flat washer 52 by pressing the flat washer 52 down, typically by pressing the beveled bottom 19 of the front end of the striker 11 down against the top of the flat washer 52 and compressing the spring 54. This is shown in FIG. 9 with an expanded view shown in FIG. 10.

Figure 11:
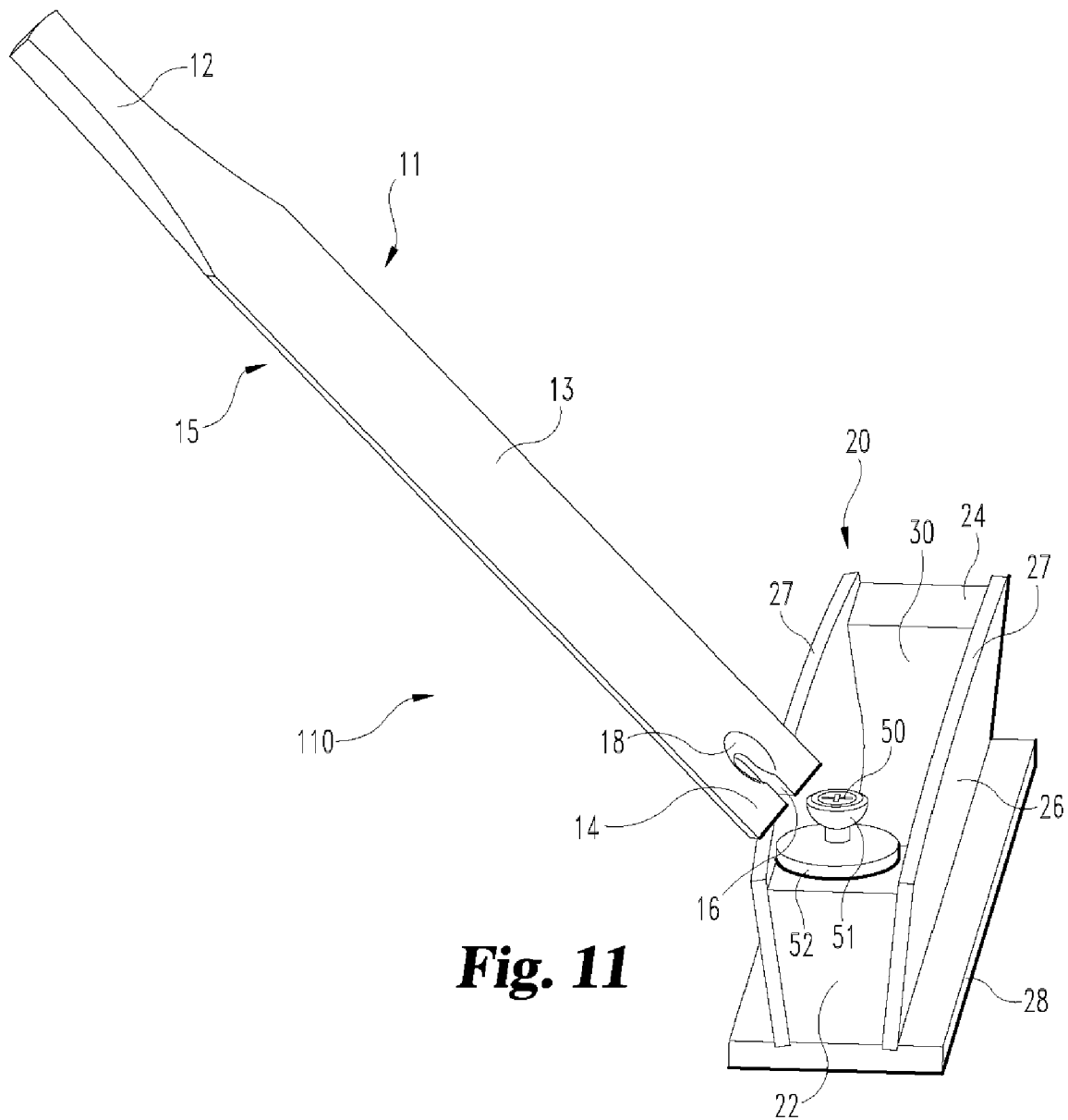
FIG. 11 is a perspective view from the front of a first embodiment of a box turkey call having a slotted striker in accordance with the present version of the invention and the striker angled away from and detached from the sound box.

With the flat washer 52 pressed down, the front edge of the beveled front end 14 can then be easily pushed between the rotator ball nut 51 and the flat washer 52 with the slot 16 fitting around the attachment stud 50. When the pressure against the top of the flat washer 52 is no longer applied, the spring 54 forces the flat washer 52 against the bottom of the striker 11 which in turn is forced up against the rotator ball nut 51. The rotator ball nut 51 is seated in the recessed socket 18 so that the striker 11 cannot be disengaged from the sound box 20 without first applying downward pressure on the flat washer 52. FIG. 11 shows the striker 11 when it is detached from the sound box 20.

The sound box and striker are typically composed of material that is lightweight, rigid, and resistant to oxidation and corrosion. The most common material for typical box turkey calls is wood, but plastic, metals, various composite materials, and the like may also be utilized.

While this version of the invention has been illustrated and described in detail in the drawings and foregoing description, the same is to be considered as illustrative and not restrictive in character, it being understood that only the preferred embodiments have been shown and described and that all changes and modifications that come within the spirit of the version of the invention are desired to be protected. For example, a number of other quick changeable connection means are available. One alternate embodiment is a quick detachable ball and socket joint where the ball portion is attached to the front wall 22 of the sound box 20 and the socket is attached to the front end 14 of the striker 11 (or vice versa). This ball and socket mechanism would allow the user to quickly snap on or detach the striker 11 from the sound box 20 while allowing pivotal attachment to the sound box 20. Another embodiment of a pivotal attachment means is a pivoting attachment socket secured to the front wall 22 of the sound box 20 with a receptacle in which the front end 14 of the striker 11 is received in compressive attachment (a compression fit) and is then in pivotal attachment relative to the sound box 20. Other quick changeable attachment means can be utilized. In any case, the inventive aspect disclosed herein is the quick changeable striker 11 that can be attached and detached from the sound box 20 without the need to remove attachment hardware.

With respect to the above description then, it is to be realized that the optimum dimensional relationships for the parts of the invention, to include variations in sizes, lengths, diameters, materials, shape, form, function and manner of operation, assembly and use, are deemed readily apparent and obvious to one skilled in the art, and all equivalent relationships to those illustrated in the drawings and described in the specification are intended to be encompassed by the present invention. The utilization of the present invention with box turkey calls may be taken as representative for use in other game calls, such as for geese.

From the foregoing, it will be understood by persons skilled in the art that an improved box turkey call has been provided. The invention is relatively simple and easy to manufacture, yet affords the ability to quickly and easily utilize a wide variety of combinations of strikers and sound boxes. While my description contains much specificity, these should not be construed as limitations on the scope of the version of the invention, but rather as an exemplification of the preferred embodiments thereof. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred form with a certain degree of particularity with respect to the attachment means described in the present disclosure with provides for quick changeability of the striker, it is understood that the present disclosure of the preferred form has been made only by way of example and numerous changes in the details of construction and combination and arrangement of parts may be resorted to without departing from the spirit and scope of the invention, which is to provide a quick changeable striker for a box turkey call.

What is claimed is:

1. A method of using a box turkey call kit, the kit including a sound box having a side wall, and a second quick connect assembly including a stud coupled to the sound box, a washer, and a spring, the washer being disposed between a top portion of the stud and the spring, the method comprising:
   providing at least two strikers each having a handle at one end and a first quick connect assembly near an opposite end thereof, the first quick connect assembly of each of the at least two strikers having the same structural shape;
   selecting a first striker from the at least two strikers, the first striker being formed of a material different than at least one of the other strikers;
   aligning the first quick connect assembly of the first striker with the second quick connect assembly;
   compressing the spring with the first striker; and
   engaging the first quick connect assembly and the second quick connect assembly.

2. The method of claim 1, further comprising sliding the first striker against the side wall of the sound box.

3. The method of claim 1, wherein the aligning step comprises:
   orienting an opening of the first quick connect assembly integrally defined in the first striker with the stud;
   inserting the stud into the opening; and
   sliding the striker laterally until the stud engages a recessed cavity defined in the striker.

4. The method of claim 3, further comprising:
   pushing the striker against the washer in a first direction to compress the spring;
   moving a rotator nut in a second direction away from the washer, the second direction being substantially opposite the first direction; and
   inserting the striker between the rotator nut and the washer; and
   positioning the rotator nut in the recessed cavity defined in a top portion of the striker.

5. The method of claim 1, further comprising:
   disengaging the first quick connect assembly and the second quick connect assembly;
   removing the selected first striker from the sound box without removing any part of the second quick connect assembly from the sound box;
   selecting a second striker from the at least two strikers; and
   coupling the second striker to the sound box.

6. The method of claim 5, wherein the disengaging step comprises:
   pivoting the first striker about a rotator nut;
   pushing the first striker against the washer;
   compressing the spring;
   moving the first striker such that the rotator nut is removed from a recessed cavity defined in the first striker;
   sliding the first striker with respect to the stud such that the stud passes through a single channel defined in the first striker; and
   pulling the first striker in a direction away from and out of contact with the stud.

7. The method of claim 1, further comprising moving the first striker relative to the stud such that the stud slides through a slotted opening defined at a front end of the first striker.

8. The method of claim 1, wherein the selecting step comprises selecting a striker for producing a desired noise based on the material of the striker.

9. A box turkey call comprising:
   a sound box with a bottom wall, side walls, front end wall and back end wall;
   a first quick changeable attachment component coupled to the front end wall, the first quick changeable attachment component including a stud, a washer, and a spring, the stud having a top portion and a bottom portion coupled to the sound box;
   a rotatable nut slidably engageable with the first quick changeable attachment component;
   a striker having a front end, a distal back end, a top surface and a bottom surface; and
   a second quick changeable attachment component defined near the front end of the striker;
   wherein, the first quick changeable attachment component and the second quick changeable attachment component are in pivotal but quickly detachable engagement;
   further wherein, when the first quick changeable attachment component and second quick changeable attachment component are engaged, the striker can be moved between a first position and a second position, in which:

in the first position,
- the striker is disposed substantially parallel to the bottom wall of the sound box;
- the spring is in an extended position pushing the washer against a bottom surface of the striker; and
- the rotatable nut is engaged with the second quick changeable attachment component such that the rotatable nut and striker can rotate but cannot move substantially laterally with respect to the stud, thereby preventing the first quick changeable attachment component and second quick changeable attachment component from disengaging; and in the second position,
- the striker is disposed at an angle with respect to the bottom wall of the sound box;
- the washer is moved downwardly along the stud to compress the spring; and
- the striker is laterally slidable with respect to the stud and rotatable nut so that the first quick changeable attachment component and second quick changeable attachment component are disengageable.

10. The box turkey call of claim 9, where the rotatable nut is disposed in a recessed portion of the striker when the first quick changeable attachment component and the second quick changeable attachment component are engaged.

11. The box turkey call of claim 9, wherein the second quick changeable attachment component consists of a longitudinal slot and a recessed portion, the recessed portion spaced from the front end of the striker such that the slot extends from the front end of the striker to the recessed portion.

* * * * *